United States Patent [19]
Brym

[11] 3,858,602
[45] Jan. 7, 1975

[54] AIR OPERATED SAFETY SHUT-OFF SYSTEM FOR LIQUID RESERVOIR FEED

[75] Inventor: Stanley J. Brym, Torrington, Conn.

[73] Assignee: Baldwin-Gegenheimer Corporation, Stamford, Conn.

[22] Filed: June 15, 1973

[21] Appl. No.: 370,316

[52] U.S. Cl............... 137/423, 137/444, 137/558
[51] Int. Cl............................................. F16k 31/28
[58] Field of Search .......... 137/386, 390, 391, 403, 137/406, 412, 413, 423, 434, 442, 444, 558

[56] References Cited
UNITED STATES PATENTS

| | | |
|---|---|---|
| 579,513 | 3/1897 | Brownlee....................... 137/423 X |
| 2,988,099 | 6/1961 | Langhans........................... 137/403 |
| 3,104,678 | 9/1963 | Cole.................................. 137/403 |
| 3,404,703 | 10/1968 | Marx.................................. 137/390 |

Primary Examiner—Martin P. Schwadron
Assistant Examiner—David R. Matthews

[57] ABSTRACT

An air operated safety system for controlling the level of liquid in a container. A pressurized air system is provided to maintain a valve in a liquid feed system open and a value in a safety alarm system closed during normal safe operation. An unsafe condition depressurizes the system to close the liquid feed line and engage the safety alarm.

9 Claims, 2 Drawing Figures

AIR OPERATED SAFETY SHUT-OFF SYSTEM FOR LIQUID RESERVOIR FEED

BACKGROUND OF THE INVENTION

1. Field of the Invention

This invention relates generally to a system for controlling the level of liquid in a container. It has particular application in controlling the liquid level in industrial containers holding flammable liquids. Alcohol containers found in the printing industry which are used to supply alcohol to the printing press fountain solution are especially suited for liquid level control by this invention.

2. Description of the Prior Art

Liquid level control devices for industrial use have been known generally for many years. Recently, the printing industry has found a need for a specialized type of liquid control system.

For sometime, offset printing presses have been provided with a water fountain pan which is filled with a solution of gum arabic and chromic or phosphoric acid dissolved in slight proportions in water. The dampening rollers of printing presses apply this "etch and gum" water solution to the non-printing portions of the printing plate on the plate cylinder of the press thus insuring that no ink from the inking rollers will be received on those dampened parts of the plates. More recently it has been found that the "gum and etch" solution has better wetting qualities if mixed with a predetermined amount of alcohol.

In such systems the alcohol serves primarily as the wetting agent and in order to insure correct wetting of the roller, the gum and etch solution and the alcohol must be maintained in predetermined proportions. Alcohol, however, is highly volatile and, accordingly, evaporates at a much faster rate than the gum and etch solution components. Accordingly, the alcohol is continuously evaporating at a faster rate than the gum, the etch or water (solvent) and if permitted to continue would drastically change the proportions of the gum and etch solution and the alcohol in the fountain solution.

A system for insuring that proper quantities of alcohol are present in the fountain solution has been developed and commercialized as the 703 BALCONTROL. The system is disclosed in U.S. Pat. No. 3,485,257 (Gegenheimer et al; issued Dec. 23, 1969). The 703 BALCONTROL is presently supplied with alcohol from a small reservoir bottle mounted directly on the 703 BALCONTROL or from a large capacity tank arranged to supply several systems.

It is an object of the present invention to provide a system for detecting unsafe high level liquid conditions in a receptacle and automatically providing means for discontinuing the flow of liquid to the receptacle.

It is another object of the present invention to provide a high level liquid detection and safety shutoff system which is particularly safe for use with flammable liquids.

SUMMARY OF THE INVENTION

The present invention is comprised of a liquid level metering assembly for delivering liquid to a receptacle, a high level detection assembly for sensing unsafe levels of liquid in the liquid receptacle and an air operated shut-off system to interrupt the flow of liquid to the liquid receptacle when a high level of liquid has been reached in the liquid receptacle. The liquid metering assembly is essentially a float operated needle valve which opens and closes the liquid delivery line as a function of the level of liquid in the receptacle. The high level detection system is a float operated valve assembly which opens a normally closed valve to depressurize the air operated shut-off system when a high liquid level is reached in the receptacle.

The air operated shut-off system is a normally closed air system which delivers air to a valve in the liquid delivery line and to the line which terminates in the liquid level detection assembly. The line to the valve in the liquid delivery line and the line to the high level detection assembly originate in an air chamber which is provided with metered air by a pressure regulator and needle valve arranged upstream in the air inlet line. Escape of air from the air chamber as a result of the opening of the line to the high level detection assembly causes a pressure drop in the air chamber and a concomitant pressure drop in the line to the valve in the liquid inlet line. Loss of pressure to the valve in the liquid inlet line causes a valve to close and cut off the flow of liquid to the receptacle.

The liquid shut-off system may also contain visual or aural signal means to indicate the existence of a high level unsafe condition in the liquid receptacle. Such means consists of an air line from the air inlet to actuate the visual or aural signal and a valve in the line to keep the line normally closed. A line from the air chamber to the valve is used to keep the valve in its normally closed position and cause opening of the valve upon pressure loss at the air chamber.

DESCRIPTION OF THE PREFERRED EMBODIMENT

The present invention is particularly suited for use in an environment wherein a volatile liquid is continually being fed to a liquid receptacle. The safety shut-off system is air operated and thus cannot generate heat or sparks necessary to ignite a flammable liquid.

Figure 1:
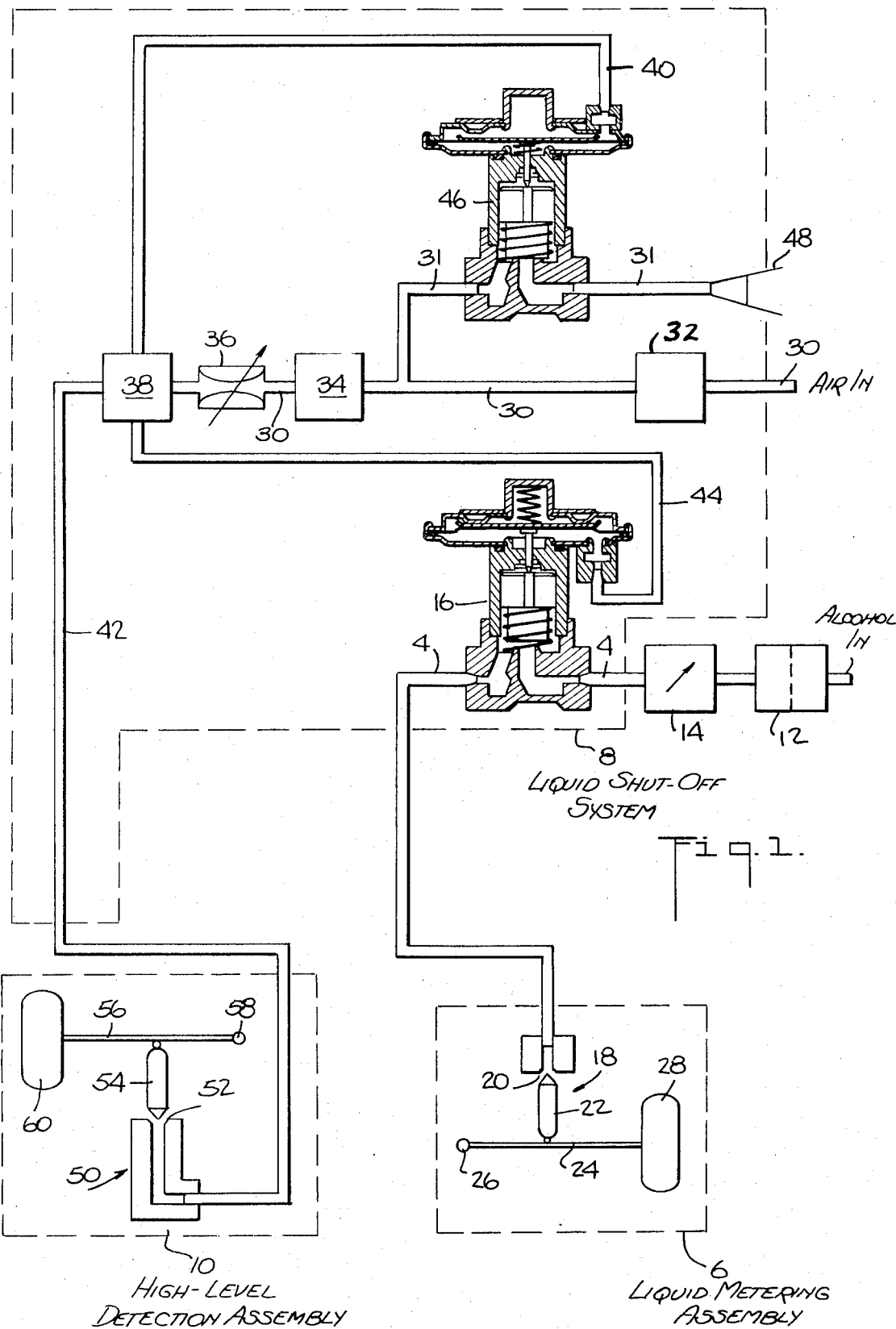
FIG. 1 is a schematic diagram of the liquid level control and safety shut-off system of the subject invention.

As best seen in FIG. 1, the subject invention consists essentially of a flammable liquid receptacle 2 such as an alcohol pan, a liquid delivery line 4, a liquid metering assembly 6, a liquid shut-off system 8 and a high level liquid detection assembly 10.

The liquid delivery line 4 is provided with a filter 12, a pressure regulator 14 and an air operated valve 16. The air operated valve 16 is a normally closed valve which can be kept in the open position by the delivery of air thereto. In practice it has been found that an ASCO two-way valve is particularly suitable for use in the system. Delivery of air to the valve maintains the valve 16 in the open position.

The alcohol metering assembly 6 is comprised of a needle valve 18 and a float 28. The liquid metering assembly 6 is preferably located in the liquid receptacle 2. The needle valve 18 consists of a valve seat 20 which is mounted directly on the end of the alcohol line 4 and a valve closure 22. A lever 24 which is pivotally mounted at pivot 26 in the liquid receptacle 2 mounts both the valve closure 22 and the float 28. The valve closure 22 is mounted on the lever 24 in alignment with the opening of valve seat 20. In operation, liquid continually flows through line 4 to the liquid receptacle 2 until a level in the liquid receptacle 2 has reached the point where the float 28 has been raised to a level which seats the valve closure 22 in the valve seat 20. Under this condition, alcohol is prevented from flowing through line 4.

The liquid shut-off system 8 is an air operated system which normally provides air to the air operated valve 16 to insure an open condition at all times. The liquid shut-off system 8 has an air inlet line 30. The air inlet line 30 is provided with an air filter 32, a pressure regulator 34 and a needle valve 36. The liquid shut-off system 8 also optionally includes an air chamber 38 which receives air from line 30 and delivers it to the air operated valve 16 through line 44, to the high level detection assembly 10 through line 42 and to a visual and aural safety alarm system through line 40.

The safety alarm system, as shown in FIG. 1, consists of an air horn 48 which is connected to the air inlet line 30 by branch line 31 and an air operated valve 46. The air operated valve 46 is similar to the air operated valve 16 but is a normally open valve. The valve 46 is kept in a closed position by delivery of air from line 40. When the air in line 40 is exhausted, the valve will open and air from the air inlet line 30 will pass through branch line 31 and ultimately through the air operated valve 46 to actuate the air horn 48.

The pressure regulator 34 and adjustable needle valve 36 are provided to reduce the pressure in the air lines. The needle valve 36 functions to prevent instantaneous delivery of air to the air operated valve 16 if air is suddenly bled from the air line 42. Lines 40 and 44 from the air line 42 terminate in closed structures. However, line 42 terminates in a valve member which, though normally closed, will open when the level in the liquid receptacle 2 has reached a high unsafe level. An air chamber 38 is optional and provides the system with means to afford more precise and accurate control. The air chamber 38 is particularly desirable in applications where the level of the surface to be sensed is prone to waves or momentary disturbances. Under such circumstances, the air chamber 38 acts as a delay which has an averaging effect to prevent false alarms from being sent through the system.

The high level detection assembly 10 is similar to the liquid metering assembly in both structure and location. The high level detection assembly 10 is mounted directly in the liquid receptacle 2 and consists of a needle valve 50 and a float 60. The valve seat 52 of the needle valve 50 is mounted directly on the end of line 42 and the valve closure 54 is mounted along with the float 60 on a lever 56 pivotally mounted at pivot 58. The float 60 is mounted at an elevation higher than the float 28. Therefore, in normal operation the float 60 should never be exposed to the liquid in the liquid receptacle 2 since the float 28 will continually operate to open and close line 4 to provide the desired liquid level in liquid receptacle 2.

The safety shut-off system operates when the liquid metering assembly 6 fails to close the needle valve 18. As previously indicated, the float 28 is raised and lowered by the level of liquid in the liquid receptacle 2. As the level of liquid in the liquid receptacle 2 recedes, the float 28 floats to a lower elevation and opens the needle valve 18, thereby allowing liquid to enter the liquid receptacle 2 from line 4. When sufficient fluid from line 4 has entered the liquid receptacle 2, the float 28 will be elevated to a level wherein the valve closure 22 will close needle valve 18 and prevent any additional flow of liquid through line 4. If the liquid metering assembly 6 fails in its normal operation due to the presence of dirt or other debris in the needle valve 18 or some basic malfunction of the assembly, the liquid in the liquid receptacle 2 will continue to rise. Absent a safety system, the system would continue to rise indefinitely and eventually flow over the top of the liquid receptacle 2. However, with the high level detection assembly 10, the liquid will continue to rise in the liquid receptacle 2 until it begins to elevate the float 60. Upon elevation of the float 60, the needle valve 50 opens and air from the normally closed line 42 exhausts.

The air pressure in the air lines 42, 40 and 44 is immediately diminished as a result of air exhausting from line 42. As a result, the air pressure in lines 40 and 44 are reduced to a level where the air operated valve 16 immediately closes and the air operated valve 46 immediately opens. Opening of air operated valve 16 closes liquid inlet line 4, thereby preventing additional delivery of liquid to the liquid receptacle 2. Opening of air operated valve 46 immediately allows delivery of air from line 31 to the air horn 48 thereby causing actuation of the air horn 48.

The lines 40, 42, 44 and air chamber 38 (when employed) are maintained in the low-pressure condition indefinitely as a result of the needle valve 36. The needle valve 36 is adjustable and is set to allow makeup air to be delivered to the air chamber 38 to make up for normal leakage that is experienced with needle valve 50 under normal conditions and any loose piping fittings in other low-pressure air lines. However, the needle valve 36 is adjusted so that it cannot compensate for any large leakage of air from the plenum chamber which results when the needle valve 50 is fully opened. In practice it has been found that the needle valve should be set to provide a pressure differential thereacross of 1 psi when the air pressure immediately upstream is in the range of 5 psig. In a particularly suitable system, air in line 30 should be at a pressure of 60–100 psig, the pressure regulator 34 should be set to reduce the pressure in line 30 to about 5 psig and the needle valve should be set to provide a pressure immediately downstream thereof of 4 psig. Thus, during normal pressurized operating conditions, the pressure in the air chamber 38 and lines 40, 42 and 44 should be at 4 psig. When valve 50 opens due to a dangerously high level of liquid in the liquid receptacle 2, the system will depressurize to a pressure level of 1.5 psig or less. With the needle valve set to provide a pressure differential thereacross of 1 psi, the pressure in the lines 40 and 44 cannot reach the level necessary to reset valves 46 and 16. In this particular application practice has shown that the valves 46 and 16 should be set to activate at 3.5 psig and deactivate at 1.5 psig.

The location of valve 50 in the liquid receptacle 2 at elevation below the float 60 provides the additional benefits when several receptacles 2 are serviced by a single liquid shut-off system 8 of affording visual means for detecting which receptacle 2 is at an unsafe level.

In the printing industry where alcohol is continuously fed to the printing press fountain solutions, the system is particularly suited for multiple unit installations. A plurality of alcohol receptacles 2 are provided with a single liquid shut-off system 8 operating from a single air source. Also, each receptacle 2 requires a separate high level detection system 10, a liquid feed line 4 and a liquid metering assembly 6.

Each high level detection assembly 10 can tap off line 42 for control air. However, multiple units have more total leakage, thus, the valve 36 must be adjusted accordingly. In the multiple unit installation, each liquid feed line can tap off the feed line 4 either upstream or downstream of valve 16. If the liquid feed line tap is upstream of valve 16, each liquid feed line will require a valve 16 and a line 44 to the air chamber 38.

In a multiple unit installation where the liquid feed lines tap into line 4 downstream of valve 16, a high level in any alcohol pan 2 will result in shutdown of the entire system. A visual inspection of the units will disclose which unit caused the shutdown. A stream of air bubbles escaping from line 42 through the alcohol bath in receptacle 2 will be issuing from the needle valve 50 which is opened, thereby indicating which unit caused the shutdown. If no remedial action is taken to repair the faulty unit, the horn 48 will continue to blow. However, the faulty unit will not be supplied with alcohol from the control supply. Under operating conditions alcohol will continue to be used from the receptacle 2. If enough is used to drop the alcohol level such that the needle valve 50 reseats, line 42 will be automatically repressurized and the system will reset itself to feed alcohol to all the multiple units. The horn 48 will cease blowing. This reengagement of the alcohol lines 4 may be sufficient to flush out any dirt in the lines 4 that may have caused the initial malfunction. In this mode of operation the needle valve 50 may be considered to be a back up for needle valve 18. A dangerously high level of alcohol is avoided but some feeding of liquid to the system is still maintained albeit in discontinuous flows. For this mode to be effective, the malfunctioning unit must be using some quantity of alcohol as normally occurs under printing press operation.

Figure 2:
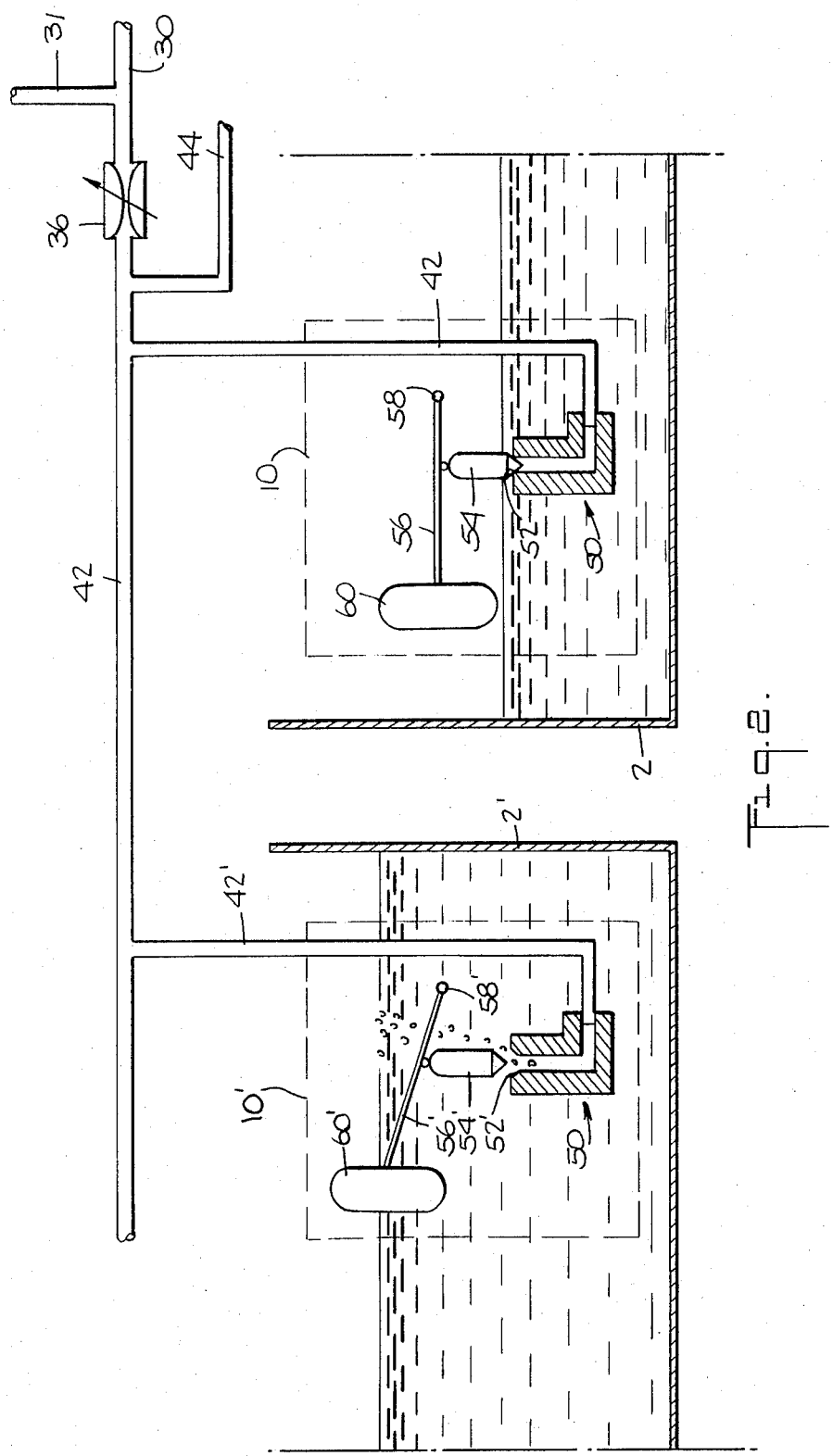
FIG. 2 is a partial schematic diagram of the liquid level control and safety shut-off system of the subject invention shown in a plural liquid receptacle application.

FIG. 2 shows a plural liquid receptacle installation. Liquid receptacles 2 and 2' are supplied with liquid from a feed line (not shown) and are provided with high level detection assemblies 10 and 10' respectively.

The level of liquid in receptacle 2 is at a safe level, thus the valve 50 is closed. Float 60, which is mounted on lever 56 for rotation about pivot 58, is above the surface of the liquid and, as a consequence, valve closure 54 is seated in valve seat 52.

Conversely, the liquid in receptacle 2' is at a dangerously high level. The float 60' has been elevated by the liquid and has caused the lever 56' to rotate around pivot 58' and in turn lift valve closure 54' from the valve seat 52' to open valve 50'.

With valve 50' open, air from lines 42', 42 and 44 escape from valve 50' and bubble up through the liquid in receptacle 2'. The bubbles provide a visual indication of which of the receptacles has caused the system to interrupt flow of liquid to the receptacle.

The system is failsafe in the sense that air pressure loss due to any cause will prevent alcohol from being delivered through line 4. Loss of shop air will shut off the alcohol feed as will breakage in any of the low-pressure air lines.

I claim:

1. Apparatus for interrupting the flow of liquid to a liquid receptacle when a dangerously high level is reached in the liquid receptacle comprising:
   a liquid inlet line to deliver liquid to the liquid receptacle;
   a valve at the terminus of the liquid inlet line;
   means for automatically closing the valve at the terminus of the liquid inlet line when the liquid in the liquid receptacle reaches the predetermined desired level and for automatically opening the valve at the terminus of the liquid inlet line when the liquid level falls below the predetermined desired level;
   a normally closed air operated valve in the liquid inlet line, which valve assumes an open position when subjected to air pressure;
   an air inlet line to deliver air to the normally closed valve in the liquid inlet line to maintain said valve in an open position;
   a branch bleed air line extending from the air inlet line into the liquid receptacle;
   a valve at the terminus of the branch bleed air line;
   means for automatically opening the valve at the terminus of the branch bleed air line to depressurize the air line delivering air to the normally closed air operated valve in the liquid inlet line when the liquid in the liquid receptacle exceeds the predetermined desired level and for automatically closing the valve at the terminus of the branch bleed air line when the liquid level in the liquid receptacle drops below the level wherein the valve at the terminus of the branch bleed air line automatically opens; and
   a needle valve located upstream of the branch bleed line for maintaining air in the air line delivering source air to the normally closed air operated valve at a rate sufficient to replenish air lost by normal system leakage but not by loss due to the opening of the valve at the terminus of the branch bleed line.

2. An apparatus as in claim 1 wherein the valve at the terminus of the liquid delivery line is comprised of a first float, a pivotal mount for the first float and a valve closure mounted on the pivotal mount to provide for vertical travel of said valve closure in alignment with the valve seat of the valve at the terminus of the liquid delivery line and wherein the valve at the terminus of the air bleed line is comprised of a second float, a pivotal mount for the second float and a valve closure mounted on the pivotal mount for the float to provide for vertical travel of said valve closure in alignment with the valve seat of the valve at the end of the air bleed line.

3. Apparatus as in claim 1 further comprising an air chamber downstream of said needle valve.

4. Apparatus as in claim 3 further comprising air operated means for signaling the presence of a dangerously high level of liquid in the liquid receptacle.

5. Apparatus as in claim 4 wherein the means for signaling the presence of a dangerously high level of liquid in the liquid receptacle is an air horn, an air line extending from the air line delivering air to the normally closed air operated valve at a location upstream of said needle valve, a normally open air operated valve in the air line extending to the air horn, a second air line extending to the normally open air operated valve in the line to the air horn to maintain said normally open valve in the closed position.

6. Apparatus as in claim 5 further comprising a pressure regulator in the air inlet line upstream of the needle valve and downstream of the line to the air horn which pressure regulator is set to deliver air at a pressure of 5 psig to the needle valve and the needle valve is set to maintain a pressure differential of 1 psi across said needle valve.

7. Apparatus as in claim 6 wherein the inlet air pressure upstream of the pressure regulator is 60–100 psig.

8. Apparatus for interrupting the flow of liquid to a plurality of liquid receptacles when a dangerously high level is reached in one of the liquid receptacles comprising:

a liquid inlet line to deliver liquid to each of the liquid receptacles;

float operated valve means in each liquid inlet line for closing the liquid inlet line when the predetermined desired liquid level has been reached in the liquid receptacle being supplied by the particular liquid inlet line;

air operated valve means for closing the lines delivering liquid to each liquid receptacle, which valve means assume an open position when subjected to air pressure;

a source of air;

an air inlet line to deliver source air to the air operated valve means to maintain said air operated valve means open;

means to detect a dangerously high level of liquid in any of the liquid receptacles;

means to depressurize the line delivering source air to the air operated valve means when a dangerously high level of liquid is detected in one of the liquid receptacles; and means to indicate which of the liquid receptacles is at a dangerously high level.

9. Apparatus as in claim 8 wherein the means to depressurize the line delivering source air to the air operated valve means and the means to indicate which of the liquid receptacles is at a dangerously high level is comprised of a plurality of air lines extending from the line delivering source air to the air operated valve means which air lines have an open termination in each liquid receptacle below the dangerously high liquid level, float operated valves to close each air line open termination and a needle valve in the line delivering source air to the air operated valve means, which needle valve is located upstream of the air lines extending to each liquid receptacle.

* * * * *